United States Patent [19]

Nagodawithana et al.

[11] 4,140,799

[45] Feb. 20, 1979

[54] METHOD OF FERMENTING BREWER'S WORT

[75] Inventors: Walter T. Nagodawithana, Milwaukee; Janet M. Cuzner, Brown Deer, both of Wis.

[73] Assignee: Jos. Schlitz Brewing Company, Milwaukee, Wis.

[21] Appl. No.: 774,028

[22] Filed: Mar. 3, 1977

Related U.S. Application Data

[63] Continuation-in-part of Ser. No. 630,803, Nov. 11, 1975, abandoned.

[51] Int. Cl.$^2$ .................... C12C 11/00; C12C 11/04
[52] U.S. Cl. .................................. 426/11; 426/16; 426/29
[58] Field of Search ................ 426/11, 13, 16, 15, 426/28, 29

[56] References Cited

U.S. PATENT DOCUMENTS 3,484,244  12/1969  Kozulis et al. .................... 426/16

FOREIGN PATENT DOCUMENTS 880875  9/1971  Canada.
880876  9/1971  Canada.

*Primary Examiner*—David M. Naff
*Attorney, Agent, or Firm*—Andrus, Sceales, Starke & Sawall

[57] ABSTRACT

Brewer's wort, having a high concentration of fermentable carbohydrates and solids such as 18° to 36° Plato which would normally ferment very slowly or incompletely, is fermented by utilizing water dilution at a point during fermentation to reduce the content of fermentable carbohydrates and solids to below 18° Plato so that fermentation proceeds to completion without inhibition. Water dilution is carried out when the fermentable carbohydrate content of the fermenting wort is 30% to 70% of its original value and after initial foam collapse within about 24–48 hours after the start of fermentation. This process makes it possible to use the headspace of the fermenting vessel which is normally set aside for initial foam generation and results in a substantial increase in productivity.

8 Claims, No Drawings

METHOD OF FERMENTING BREWER'S WORT

This application is a continuation-in-part of application Ser. No. 630,803, filed Nov. 11, 1975, now abandoned.

BACKGROUND OF THE INVENTION

In the normal fermentation of brewer's wort in the production of beer and malt beverages, about 15% to 30% of the volume of the fermenting vessel is headspace used to accommodate the generation of foam caused by the initial uptake of carbohydrate consumption in the fermentation process. In the fermenting vessels having a high height-to-diameter ratio, the headspace will generally be about 20% to 30% of the volume of the vessel due to the increased tendency for foam generation in a taller vessel, while in vessels having a lower height-to-diameter ratio, the headspace will comprise about 15% to 20% of the volume of the vessel.

Lowering of the fermentation temperature will reduce the rate of foam generation, but will also prolong the duration of the fermentation which is undesirable from a production standpoint.

In normal brewing fermentation, the wort to be fermented has a solids content in the range of about 11° to 18° Plato, and when using a wort having a solids content in the upper portion of this range, the fermented substrate is diluted after fermentation to the desired and gravity, thereby increasing the production capacity of existing equipment. While it would be desirable to ferment a wort of higher solids content than 18° Plato, and therefore increase the productivity without the use of additional capital equipment, attempts to ferment wort of a higher gravity, such as 18° to 24° Plato, have not been successful from a commercial standpoint, for they require extraordinarily long periods to achieve complete fermentation under normal fermentation conditions. In order to make the most effective use of capital equipment, prolonged fermentation periods are not desired.

It has also been found that complete fermentation of brewer's wort having an initial solids content of above 24° Plato and in the range of 24° to 36° Plato, cannot be obtained by traditional practices, regardless of the time and temperature of fermentation, because activity of the yeast stopped long before limit attenuation was reached.

SUMMARY OF THE INVENTION

The invention relates to a method of fermenting a fermentable substrate, such as brewer's wort, having a high concentration of fermentable carbohydrates which would normally ferment very slowly, or incompletely, by utilizing a water dilution at a predetermined point in the fermentation. In accordance with the method of the invention, brewer's wort having a solids content in the range of 10° to 36° Plato, and generally above 18° Plato, is pitched with yeast in a fermenting vessel and the wort will occupy about 50% to 85% of the volume of the vessel, with the specific volume in a particular instance depending on the solids content of the wort, the configuration of the vessel and other factors. The wort is fermented under normal fermenting conditions and foam is generated during the initial carbohydrate consumption in the fermentation process to substantially fill the headspace of the vessel. After the carbohydrate consumption rate has slowed, the foam will collapse.

Following collapse of the foam, which is generally after the second day of fermentation, the fermentable substrate is diluted to an equivalent of 18° Plato wort, or less, with water which is free of dissolved oxygen. The dilution is such that the diluted substrate will occupy substantially the entire volume of the fermenting vessel.

The dilution is made within a time span or interval beginning at that point in time when the rate of fermentation begins to decrease. The decrease in fermentation can be identified by a decrease in the rate of carbon dioxide evolution or when the rate of decrease in the real extract or in the apparent extract begins to diminish or level off. The beginning of interval can also be approximated in practical terms by the visually observed collapse of the foam head.

The end point of the time interval for the dilution is when the fermentable substrate is decreased to a value of about 30% of its original value, and the end point normally occurs within about 4 hours after the decrease in the rate of fermentation.

After dilution, the fermentation is continued under standard process conditions until limit attenuation is reached. The fermented wort is then processed and packaged according to conventional techniques.

Through use of the water dilution after the initial foam collapse, it is possible to use the headspace of the fermenting vessel which is normally set aside for initial foam generation. This results in a substantial increase in productivity, generally in the range of 10% to 35%, without the use of additional capital equipment. Furthermore the dilution acts to reduce the osmotic pressure across the yeast cell membrane, as well as to increase the concentration gradient of ethanol between the inside and outside of the cell, facilitating diffusion of ethanol to the medium. The reduced osmotic pressure and ethanol concentration also reduces the combined inhibitory effect on the rate of fermentation, thereby resulting in complete fermentation of the fermenable carbohydrates within a normal fermenting period.

The beer, or other beverage produced by the method of the invention has similar flavor, aroma, and stability characteristics as that produced by conventional fermentation procedures.

The dilution method of the invention can be used in the fermentation of a wide variety of fermentable substrates, such as beer, malt beverages, wine, distilled spirits, antibiotics, or other materials where there is a substantial generation of foam in the initial stages of fermentation due to gas evolution.

Other objects and advantages will appear in the course of the following description.

DESCRIPTION OF THE PREFERRED EMBODIMENT

It has been found that there is an inhibitory effect on fermentation when fermenting a substrate having a high concentration of dissolved solids. For example, when dealing with brewer's wort, a wort having a solids content in the range of about 18° Plato to 24° Plato requires extraordinary long periods of time to achieve complete fermentation under normal fermenting conditions, while fermentation of brewer's wort having a solids contents in the range of 24° to 36° Plato cannot be brought to completion under traditional brewing practice.

The inhibitory affect on fermentation is not due to a decrease in viability of the yeast, for monitoring the ATP (adenosine triphosphate) level inside the yeast cells has shown that the ATP level remains substantially high at the time of slowing down of the fermentation. Likewise, the slowing down of fermentation is not due to the denaturation of enzymes during the course of fermentation, and protein synthetsis has been noted to be normal.

However, it has been discovered that the slowing down of fermentation in high Plato worts is due to the combination of the high concentration of ethanol in the yeast cells along with a high osmotic pressure across the cell membrane. During the fermentation of a high plato wort, such as 24° Plato wort, the ethanol content within the yeast cells increases at a faster rate than with a lower Plato wort, such as 18° Plato wort. However, as the initial solids concentration of the wort is increased above 24° Plato, there is a gradual decrease in the ability of the the yeast to ferment under normal brewing conditions. It has also been observed that the concentration of ethanol within the yeast cells is lower at solids concentrations above 24° Plato than at 24° Plato. Thus, the slowing down of the high gravity fermentation is not entirely due to the produced ethanol, but the osmotic pressure also acts to depress the rate of fermentation at high gravity fermentation.

In accordance with the invention, the inhibitory affect on high gravity worts caused by the high ethanol content and the elevated osmotic pressure can be counteracted by a water dilution at a specific time during the fermentation process.

In carrying out the method of the invention with respect to brewer's wort, the wort is prepared by conventional techniques and has a solids content in the range of 10° Plato to 36° Plato and preferably in the range of 20° to 25° Plato. In general, the wort is prepared by mashing malt with an adjunct with the malt comprising from about 35% to 65% by weight of the total extract weight of malt and adjunct with the adjunct being the balance. To achieve the high gravity without concentration of the wort, the malt concentration will generally be in the range of 35% to 55% of the total extract weight of malt and adjunct. Using a greater proportion of malt will result in a wort having a solids content below 18° Plato and this lower gravity wort can be concentrated by evaporation to obtain the desired high gravity in the range of 18° to 36° Plato. However, concentration is not preferred due to the increased time and energy requirements.

The wort is pitched with brewer's yeast in a standard type of fermentation vessel and the wort will occupy about 50% to 85% of the volume of the vessel, with the specific wort volume depending on the shape of the vessel, the gravity of the wort, and other factors.

The yeast can be any typical yeast, such as *Saccharomyces carlsbergensis*, *Saccharomyces cerevisae*, *Saccharomyces uvarum*, *Saccharomyces oviformis*, *Saccharomyces frustuum*, *Saccharomyces fermentati*, and the like. The particular species or genera of yeast is not critical to the invention.

The yeast is pitched in the rate of $10 \times 10^6$ to $30 \times 10^6$ cells per ml, with a pitching rate of about $14 \times 10^6$ to $25 \times 10^6$ cells per ml being typical.

The temperature of fermentation for brewer's wort is in the traditional range of about 56° F. to 60° F., but temperatures in the range of 48° F. to 75° F. can be utilized.

The fermentation can be carried out either under conditions of agitation, as shown in U.S. Pat. No. 3,484,244, or it can be conducted under static conditions. Through use of agitation, as disclosed in the aforementioned patent, the fermentation will be accelerated so that the fermentation can be completed in a period of about 6 days as compared with a period of about 10 to 30 days for static fermentation processes.

During the initial uptake of carbohydrate consumption in the fermentation process, a substantial head of foam is generated. The volume of the wort initially introduced into the fermenting vessel is correlated with the rate of fermentation, so that the foam will substantially fill the entire headspace of the vessel.

Subsequently, the rate of carbohydrate consumption will decrease, causing the foam to collapse to a point where the foam occupies only about 5% to 7% the volume of the vessel, while prior to the collapse, the foam occupied about 15% to 30% of the volume of the vessel. The foam collapse will normally occur in a period of about 24 to 48 hours following the start of the fermentation process. At this stage, with the high gravity wort, the fermentation, if the wort was not diluted, would slow and ultimately stop as a result of the ethanol content reaching a critical level for a wort of this high gravity.

In accordance with the invention, water is introduced into the fermenting vessel after collapse of the foam with the amount of water being such that the diluted wort has a gravity of about 18° Plato or less, based on the original gravity, and occupies upwards of about 95% of the entire volume of the vessel. The water dilution enables the vacant fermenter headspace to be utilized in the fermentation process and also increases the ethanol concentration gradient from the inside of the yeast cells to the outside while reducing the osmotic pressure across the cells so that fermentation can proceed to completion.

The water dilution to the partially fermented substrate is made within a time span beginning at that point in time when the rate of fermentation begins to decrease. The decrease in fermentation can be identified by a decrease in the rate of carbon dioxide evolution, as measured by monitoring the discharge of carbon dioxide from the vessel, or when the rate of decrease of the apparent extract diminishes, as measured by a hydrometer, or when the rate of decrease of the real extract begins to diminish or level off.

The beginning of the time period for the water dilution can also be determined visually by viewing the foam collapse which occurs after the period of rapid carbohydrate uptake. More specifically, the dilution is performed when the actual foam of wort volume ratio is equal to or less than the value of F as determined from the following formula:

$$F = \frac{1.25 \, W_I (1 - f)}{W_D f}$$

where F is the foam volume/wort volume immediately prior to dilution; f is the fraction of total fermenter volume occupied by the wort after dilution; $W_I$ is the weight of the solids in pounds/bbl of the wort at original gravity prior to dilution; and $W_D$ is the weight of solids in pounds/bbl of the wort at original gravity after dilution. As an example, if the original gravity of the wort prior to dilution is 24° P. (68.3 pounds of solids/bbl) and if it is desired to dilute the wort to 18° Plato equivalent (49.9 pounds of solids/bbl) and if the fraction of the fermenter to be occupied after dilution is 0.95, then, $$F = \frac{1.25\ (68.3\ (1.00 - .95) = .09}{49.9\ (.95)}$$

When the actual foam to wort volume ratio, as observed in the fermenter, is equal to or less than 0.09, the dilution can be made.

The end point of the time interval for the water dilution occurs when the fermentable substrate is decreased to a value by weight of about 30% of its original value, and in practice the dilution is made when the fermentable substrate is decreased to a value of about 30% to 70%, and preferably about 40%, by weight of its original value. The dilution, under normal practice, is made within about 4 hours after the decrease in the rate of fermentation or collapse of the foam head. The partially fermented substrate at the time of dilution will have a solids contents of about 50% to 80% of its original solids content.

The water employed in the dilution is preferably deaerated water. Utilizing aerated water could produce new yeast cell growth and increase the VDK content of the substrate. Thus, it is preferred to use deaerated water or carbonated water for the dilution.

The temperature of the water used in the dilution is not critical and under normal practice, the water is at the fermentation temperature of 48° F. to 70° F. The water can be introduced into the fermenting vessel at any location in the vessel, and normally it is introduced through the existing feed lines.

Following the dilution, the fermentation is continued to completion. If agitation is used in the fermentation, the end gravity will be obtained in about 7 days using normal fermentation temperatures while under static conditions, the end gravity will be reached in about 10 to 30 days. If the diluted fermentable substrate has a solids content of about 15° Plato to 18° Plato, the substrate after completion of fermentation will have a gravity and ethanol content above that of the normal beer or malt beverage so that the fermented substrate is diluted with carbonated water to the final desired ethanol content.

After completion of fermentation the fermented substrate is processed and packaged according to standard procedures.

When using a wort having an initial gravity in the upper portion of the 18° to 36° Plato range, it is possible to add the dilution water in a series of steps following the collapse of the foam, rather than adding all of the water in a single dilution step.

The following examples illustrate the method of the invention.

EXAMPLE I

A 24° Plato wort having the following wort analysis was produced by mashing 50% by extract weight of malt and using 50% by extract weight of corn syrup as adjunct.

| | |
|---|---|
| Wort Color (° Lov.,1" Cell) | 13.9 |
| Total Solids, ° Plato | 24.16 |
| Wort Protein (N × 6.25)% | 0.71 |
| Soluble Nitrogen, g/100g | 0.113 |
| Formol Nitrogen, g/100g | 0.0293 |
| F.N. as % S.N. | 25.9 |
| Wort pH | 5.0 |
| Titratable Acidity: ml $^N/10$Alkali/100g | 19.2 |
| Wort Calcium, ppm | 121 |
| Iso-compounds, ppm | 36.8 |
| Alpha acids, ppm | 3.2 |
| Anthocyanogen, ppm | 63.4 |
| Specific gravity | 1.10181 |
| Total solids (Diluted) ° Plato | 18.55 |
| Limit Attenuation (Diluted), ° Plato | 4.93 |
| Fermentable Extract (Diluted), % | 60.00 |

485 barrels of the 24° Plato wort were introduced into a commercial fermenting vessel having a capacity of 735 bbls. and the wort was pitched with a strain of the yeast *Saccharomyces carlsbergensis*, at a pitching rate of $14.6 \times 10^6$ cells per ml.

The fermentation temperature was initially 56° F. and after 17 hours the temperature was raised to 60° F. Agitation was employed during the fermentation.

After approximately 48 hours the foam head in the vessel collapsed and the wort was diluted using 180 barrels of deaerated carbonated water. The dilution reduced the solids content to a value of 18° Plato based on the original Plato. The temperature was maintained at 60° F. for a total period of 7 days until fermentation was completed.

An 18° Plato control wort was fermented without dilution and using identical fermentation conditions and the fermentation data for both the diluted wort and the control wort is shown in the following Table I.

TABLE I

| | 24° Plato diluted to 18° Plato wort equivalent, on second day | | | | | | 18° Plato Wort Control | | |
|---|---|---|---|---|---|---|---|---|---|
| Days | Real Extract g/100g | Cells/ml (× 10⁶) | Foam Vol. / Liq. Vol. | Liquid Vol. Bbl. | Ethanol W/W % | Diacetyl ppm | Real Extract g/100g | Cells/ml (× 10⁶) | Ethanol W/W % |
| 0 | 23.78 | 14.6 | .34 | 485 | 0 | — | 17.66 | 13.2 | 0 |
| 1 | 21.22 | 62.8 | .39 | 485 | 1.28 | 1.72 | — | 55.0 | — |
| 2 | 16.92 | 76.3 | .08 | 485 | 3.78 | .68 | 11.40 | 64.0 | 3.43 |
| 2 After Dilution | 12.64 | 62.3 | .02 | 665 | 2.72 | .60 | — | — | — |
| 3 | 10.15 | 59.8 | .02 | 665 | 4.31 | .52 | 9.19 | 69.3 | 4.80 |
| 4 | 8.41 | 62.3 | .02 | 665 | 5.19 | .35 | 7.87 | 69.8 | 5.78 |
| 5 | 7.67 | 59.5 | .02 | 665 | 5.72 | .14 | 7.58 | 66.0 | 5.78 |
| 6 | 7.51 | 58.0 | .02 | 665 | 5.87 | .06 | 7.47 | 69.4 | 5.97 |
| 7 | 7.48 | 59.5 | .02 | 665 | 5.98 | .04 | 7.41 | 59.9 | 5.95 |

After fermentation, both the fermented wort produced by the dilution method and the fermented control wort were processed by conventional techniques, and a flavor evaluation test indicated that there was no organoleptic difference between the beer produced by the dilution method of the invention and that produced from the control wort.

EXAMPLE II

A second fermentation was carried out using conditions that were identical to that described with respect to Example I, except that the wort was pitched with yeast recovered from the brew of Example I, and the pitching rate was substantially higher, being 24.5 × 10⁶ cells per ml.

The only significant difference in this fermentation from that described with respect to Example I was a considerably higher relative value of foam produced in the early stages of fermentation. As in the case of the fermentation of Example I, the dilution was executed 48 hours after pitching to reduce the solids content to 18° Plato, equivalent.

The following Table lists the fermentation data from the brew fermented in accordance with the dilution method of the invention, as well as the data from an 18° Plato control wort fermented with no dilution and using the same fermentation conditions.

| Wort Color (° Lov., 52-1" Cell) | 24.2 |
|---|---|
| Total Solids, ° Plato | 30.65 |
| Wort Protein, (N × 6.25)% | 1.02 |
| Soluble Nitrogen, g/100g | 0.163 |
| Formol Nitrogen, g/100g | 0.0427 |
| F.N. as % Sol.Nitrogen | 26.2 |
| Wort pH | 5.08 |
| Titratable Acidity: ml $^N$/10 Alkali/100g. | 23.8 |
| Wort Calcium, ppm | 62.0 |
| Iso-Compounds, ppm | 24.5 |
| Alpha-Acids, ppm | 4.9 |
| Anthocyanogens, ppm | 99.6 |
| Specific Gravity | 1.13223 |
| Total Solids (diluted) ° P | 18.66 |
| Limit Attenuation (diluted) | 4.63 |
| Fermentable Extracts (diluted) | 60.83 |
| Extract Yield, % D.B. | 76.93 |

10.9 liters of the wort were introduced into a pilot

TABLE 2

| | 24° Plato diluted to 18° Plato wort equivalent on second day | | | | | | 18° Plato Wort Control | | |
|---|---|---|---|---|---|---|---|---|---|
| Days | Real Extract g/100g | Cells/ml (× 10⁶) | Foam Vol. / Liq. Vol. | Liquid Vol. Bbls. | Ethanol W/W % | Diacetyl ppm | Real Extract g/100g | Cells/ml (× 10⁶) | Ethanol W/W % |
| 0 | 24.28 | 24.5 | .47 | 460 | 0 | 0 | 18.0 | 12.8 | 0 |
| 1 | 21.03 | 78.9 | .52 | 460 | 1.70 | 1.27 | 16.25 | 51.8 | .98 |
| 2 | 16.78 | 97.4 | .09 | 460 | 4.12 | .62 | 12.07 | 73.8 | 3.13 |
| 2 After Dilution | 12.20 | 67.8 | .03 | 638 | 3.24 | .51 | — | — | — |
| 3 | 9.85 | 76.7 | .03 | 638 | 4.50 | .37 | 9.78 | 61.8 | 4.41 |
| 4 | 8.10 | 67.7 | .03 | 638 | 5.53 | .47 | 8.29 | 66.4 | 5.28 |
| 5 | 7.64 | 75.3 | .03 | 638 | 5.83 | .18 | 7.79 | 72.3 | 5.74 |
| 6 | 7.54 | 77.1 | .03 | 638 | 6.06 | .09 | 7.62 | 71.9 | 5.78 |
| 7 | 7.45 | 70.2 | .03 | 638 | 6.11 | .06 | 7.62 | 70.0 | 5.93 |

A flavor evaluation test indicated that there was no organoleptic difference between the beer produced using the dilution method of the invention as compared with that produced from the control wort.

EXAMPLE III

A fermentation was carried out similar to that described with Example I, except that the wort was pitched with yeast recovered from the brew produced in Example II.

As in the case of the prior examples, the wort was diluted to 18° Plato equivalent after 48 hours and the fermentation data from this brew, along with the fermentation data from an 18° Plato control wort are shown in the following Table III.

fermenter having a volume of 19 liters and the wort was pitched with 13.3 × 10⁶ cells/ml at 56° F. The wort was continuously agitated within the fermenting vessel and after 17 hours the temperature was raised to 60° F.

At the end of 48 hours, 8.2 liters of carbonated water were added to the vessel reducing the solids content to 18° Plato equivalent. The temperature was maintained at 60° F. for a period of 8 days until the completion of fermentation. The fermentation data is listed in the following Table IV.

TABLE IV

| | 30° P. Diluted to 18° P. Wort Equivalent on the Second Day | | | |
|---|---|---|---|---|
| Day | Real Extract | Cells/ml (× 10⁶) | Ethanol %/W/W | Diacetyl ppm |

TABLE 3

| | 24° Plato diluted to 18° Plato wort equivalent on second day | | | | | | 18° Plato Wort Control | | |
|---|---|---|---|---|---|---|---|---|---|
| Days | Real Extract g/100g | Cells/ml (× 10⁶) | Foam Vol. / Liq. Vol. | Liquid Vol. Bbls. | Ethanol W/W % | Diacetyl ppm | Real Extract g/100g | Cells/ml (× 10⁶) | Ethanol W/W % |
| 0 | 24.76 | 17.7 | .25 | 480 | 0 | 0 | 17.78 | 15.3 | 0 |
| 1 | 21.14 | 59.4 | .40 | 480 | .45 | 1.24 | 14.23 | 55.0 | 1.43 |
| 2 | 17.23 | 83.8 | .09 | 480 | 3.97 | .77 | 11.56 | 78.4 | 3.52 |
| 2 After Dilution | 12.47 | 66.2 | .06 | 662 | 2.99 | .55 | | 72.7 | — |
| 3 | 9.61 | 65.7 | .06 | 662 | 4.69 | .65 | 9.15 | 73.4 | 4.93 |
| 4 | 7.88 | 67.7 | .06 | 662 | 5.58 | .38 | 7.77 | 79.1 | 5.73 |
| 5 | 7.48 | 69.9 | .06 | 662 | 5.83 | .16 | 7.50 | 69.4 | 6.04 |
| 6 | 7.33 | 64.7 | .06 | 662 | 6.00 | .07 | 7.34 | 73.0 | 6.08 |
| 7 | 7.28 | 67.0 | .06 | 662 | 5.98 | .05 | 7.30 | | 6.07 |

EXAMPLE IV

A 30.65° Plato wort having the following wort analysis was prepared by mashing 50% by extract weight of malt and using 50% by extract weight of corn syrup, as the adjunct.

| 0 | 30.65 | 13.3 | — | — |
|---|---|---|---|---|
| 1 | 29.80 | 23.8 | 0.42 | 2.10 |
| 2* | 25.60 | 91.5 | 2.73 | 4.20 |
| 3 | 11.65 | 94.5 | 3.66 | 2.16 |
| 4 | 9.72 | 100.8 | 4.52 | 2.35 |
| 5 | 8.13 | 97.5 | 5.78 | 1.06 |
| 6 | 7.57 | 94.5 | 6.13 | 0.35 |
| 7 | 7.46 | 83.5 | 6.22 | 0.17 |

TABLE IV-continued

| | 30° P. Diluted to 18° P. Wort Equivalent on the Second Day | | | |
|---|---|---|---|---|
| Day | Real Extract | Cells/ml ($\times 10^6$) | Ethanol %/W/W | Diacetyl ppm |
| 8 | 7.38 | 99.3 | 6.14 | 0.07 |

*Just before dilution

Through use of the water dilution step in the fermentation process after the initial foam collapse, it is possible to use the headspace of the fermenting vessel which is normally set aside for initial foam generation. This results in a substantial increase in productivity without the use of additional capital equipment.

In addition, the dilution acts to reduce the osmotic pressure across the yeast cells and provides a greater concentration differential of ethanol between the inside and the outside of the cells, thereby enabling the ethanol to be released from the yeast cells and permitting complete conversion of the fermentable carbohydrates within the normal fermenting period.

While the above description has illustrated the process of the invention as used with the fermentation of brewer's wort, the dilution process can be utilized in the fermentation of any product where there is a substantial generation of foam in the early stages of fermentation, such as in the fermentation of wine, distilled spirits, anti-biotics, and the like. With the use of the dilution process, the normal fermentation conditions for the particular fermentable substrate are not altered, in that the same fermenting temperatures, yeast strains, pitching rates, time duration, etc., can be employed as in the conventional fermenting practice for that substrate.

Various modes of carrying out the invention are contemplated as being within the scope of the following claims particularly pointing out and distinctly claiming the subject matter which is regarded as the invention.

We claim:

1. The method of preparing an alocholic beverage, comprising the steps of preparing an aqueous fermentable substrate containing fermentable carbohydrates and having a solids content in the range of 18° to 36° Plato, introducing the substrate into a fermenting vessel with the substrate occupying an original volume of about 50% to 85% of the volume of the vessel with the remainder of the volume being headspace, pitching the substrate with yeast, fermenting the substrate with the initial stage of fermentation generating a head of foam which occupies the headspace of the vessel, a subsequent decrease in carbohydrate consumption causing a collapse of said foam head, introducing water into the vessel to dilute the substrate to an equivalent initial solids content below 18° Plato after the rate of fermentation begins to decrease and when the fermentable carbohydrate content is at a value of 30% to 70% by weight of its original value, said diluted wort occupying a substantially greater volume than said original volume, and continuing the fermentation in the same vessel and under substantially the same fermentation conditions to the desired end gravity.

2. The method of claim 1, wherein the wort is agitated during fermentation.

3. The method of claim 1, wherein the water is deaerated.

4. The method of claim 1, wherein said diluted wort occupies at least 95% of the volume of the vessel.

5. The method of claim 1, wherein continuing the fermentation after dilution with water is carried out without the removal of yeast.

6. The method of claim 1, wherein the yeast is pitched at a rate of $10 \times 10^6$ to $30 \times 10^6$ cells per ml.

7. The method of claim 1, wherein the fermentable substrate has an initial solids content in the range of 24° to 36° Plato.

8. The method of claim 1, wherein the dilution is made within 4 hours after the collapse of said foam head.

* * * * *